(12) United States Patent
Sun et al.

(10) Patent No.: US 12,185,330 B2
(45) Date of Patent: Dec. 31, 2024

(54) PHYSICAL DOWNLINK CONTROL CHANNEL (PDCCH) RELIABILITY ENHANCEMENT

(71) Applicant: APPLE INC., Cupertino, CA (US)

(72) Inventors: Haitong Sun, Cupertino, CA (US); Chunhai Yao, Beijing (CN); Chunxuan Ye, San Diego, CA (US); Dawei Zhang, Cupertino, CA (US); Hong He, Cupertino, CA (US); Jie Cui, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 484 days.

(21) Appl. No.: 17/593,540

(22) PCT Filed: Apr. 14, 2021

(86) PCT No.: PCT/CN2021/087249
§ 371 (c)(1),
(2) Date: Sep. 20, 2021

(87) PCT Pub. No.: WO2022/028001
PCT Pub. Date: Feb. 10, 2022

(65) Prior Publication Data
US 2022/0312393 A1 Sep. 29, 2022

(30) Foreign Application Priority Data

Aug. 6, 2020 (WO) .............. PCT/CN2020/107499

(51) Int. Cl.
*H04W 72/23* (2023.01)
*H04L 1/08* (2006.01)
(Continued)

(52) U.S. Cl.
CPC .............. *H04W 72/23* (2023.01); *H04L 1/08* (2013.01); *H04W 72/044* (2013.01)

(58) Field of Classification Search
CPC ........... H04W 36/0072; H04W 72/044; H04W 72/23; H04W 8/20; H04L 1/08; H04L 1/189
See application file for complete search history.

(56) References Cited

U.S. PATENT DOCUMENTS

| | | | |
|---|---|---|---|
| 2014/0161056 A1* | 6/2014 | Moulsley | H04B 7/024 370/329 |
| 2014/0321382 A1* | 10/2014 | Guan | H04W 72/20 370/329 |

(Continued)

OTHER PUBLICATIONS

Nokia, "Introduction of NR URLLC support", R1-1913198, 3GPP TSG-RAN WG1 Meeting #99, Reno, Nevada, Draft Change Request 38.214 Current Version 15.7.0, Nov. 18-22, 2019, 33 pages.

(Continued)

*Primary Examiner* — Jenee Holland
(74) *Attorney, Agent, or Firm* — Dorsey & Whitney LLP

(57) ABSTRACT

This disclosure describes the following enhancement to improve the PDCCH reliability: PDCCH aggregation and multi-beam PDCCH reception for a 5G wireless communication system. The disclosed techniques entail obtaining repeated PDCCH by processing a PDCCH-Config, ControlResourceSet, or SearchSpace configuration parameter including an information element (IE) indicating a number of consecutive slots in which the PDCCH is repeated. In another embodiment, a gNB generates the PDCCH-Config, ControlResourceSet, or SearchSpace configuration param- (Continued)

eter for configuring a UE to receive the repeated PDCCH and employ the multi-beam PDCCH reception.

17 Claims, 10 Drawing Sheets

(51) Int. Cl.
  *H04L 5/00* (2006.01)
  *H04W 72/044* (2023.01)

(56) References Cited

U.S. PATENT DOCUMENTS

| | | | |
|---|---|---|---|
| 2015/0341918 A1* | 11/2015 | Yang | H04L 5/00 370/312 |
| 2017/0013615 A1 | 1/2017 | Suzuki et al. | |
| 2017/0332386 A1* | 11/2017 | Li | H04W 72/0446 |
| 2019/0141679 A1* | 5/2019 | He | H04L 5/0053 |
| 2019/0190582 A1* | 6/2019 | Guo | H04B 17/17 |
| 2019/0223164 A1* | 7/2019 | He | H04L 25/0204 |
| 2019/0230697 A1* | 7/2019 | Yang | H04W 72/044 |
| 2019/0306812 A1* | 10/2019 | Sengupta | H04L 5/0064 |
| 2019/0306857 A1* | 10/2019 | Lin | H04L 5/0007 |
| 2019/0313383 A1* | 10/2019 | Xiong | H04W 16/14 |
| 2019/0319823 A1* | 10/2019 | Akkarakaran | H04W 76/27 |
| 2020/0015258 A1 | 1/2020 | Zhou et al. | |
| 2020/0045696 A1* | 2/2020 | Huang | H04L 5/10 |
| 2020/0059821 A1* | 2/2020 | Wirth | H04W 80/02 |
| 2020/0112984 A1* | 4/2020 | Islam | H04W 74/0833 |
| 2020/0154295 A1* | 5/2020 | Lin | H04W 24/08 |
| 2020/0169991 A1 | 5/2020 | Lin et al. | |
| 2020/0177306 A1* | 6/2020 | Choi | H04L 5/0053 |
| 2020/0221428 A1* | 7/2020 | Moon | H04B 7/024 |
| 2020/0260411 A1* | 8/2020 | Hong | H04W 24/08 |
| 2020/0389874 A1* | 12/2020 | Lin | H04L 5/0096 |
| 2021/0036829 A1* | 2/2021 | Kuang | H04L 5/0023 |
| 2021/0185646 A1* | 6/2021 | Zhou | H04B 7/0404 |
| 2021/0243680 A1* | 8/2021 | Harada | H04L 1/0072 |
| 2021/0258964 A1* | 8/2021 | Khoshnevisan | H04B 7/0695 |
| 2021/0321460 A1* | 10/2021 | Taherzadeh Boroujeni | H04L 43/16 |
| 2021/0368457 A1* | 11/2021 | Chen | H04L 5/0035 |
| 2021/0400714 A1* | 12/2021 | Huang | H04L 1/1864 |
| 2022/0007395 A1* | 1/2022 | Lei | H04L 1/0003 |
| 2022/0015091 A1* | 1/2022 | Li | H04L 1/1854 |
| 2022/0039061 A1* | 2/2022 | Murray | H04W 68/02 |
| 2022/0338235 A1* | 10/2022 | Bagheri | H04L 5/0044 |
| 2022/0417904 A1* | 12/2022 | Kwak | H04W 72/30 |
| 2023/0008553 A1* | 1/2023 | Tsai | H04L 27/0006 |
| 2023/0133217 A1* | 5/2023 | Li | H04W 72/232 370/329 |

OTHER PUBLICATIONS

NTT Docomo, Inc., "Enhancements on multi-TRP/panel transmission", R1-1911184, 3GPP TSG RAN WG1 #98bis, Chongqing, China, Agenda Item 7.2.8.2, Oct. 14-20, 2019, 32 pages.

WIPO, International Search Report and Written Opinion, PCT/CN2021/087249, Jul. 15, 2021, 9 pages.

Huawei, Hisilicon, "Reliability enhancement on PDCCH with multi-TRP panel transmission", R1-1907528, 3GPP TSG RAN WG1 meeting #97, Reno, Nevada, Agenda Item 7.2.8.5, May 13-17, 2019, 3 pages.

Huawei, Hisilicon, "Summary of AI: 7.2.8.2 Enhancements on Multi-TRP/Panel Transmission of Offline Discussion", R1-1907706, 3GPP TSG RAN WG1 Meeting #97, Reno, Nevada, Agenda Item 7.2.8.2, May 13-17, 2019, 66 pages.

* cited by examiner

PHYSICAL DOWNLINK CONTROL CHANNEL (PDCCH) RELIABILITY ENHANCEMENT

TECHNICAL FIELD

This application relates generally to wireless communication systems, including PDCCH aggregation and multi-beam PDCCH reception.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
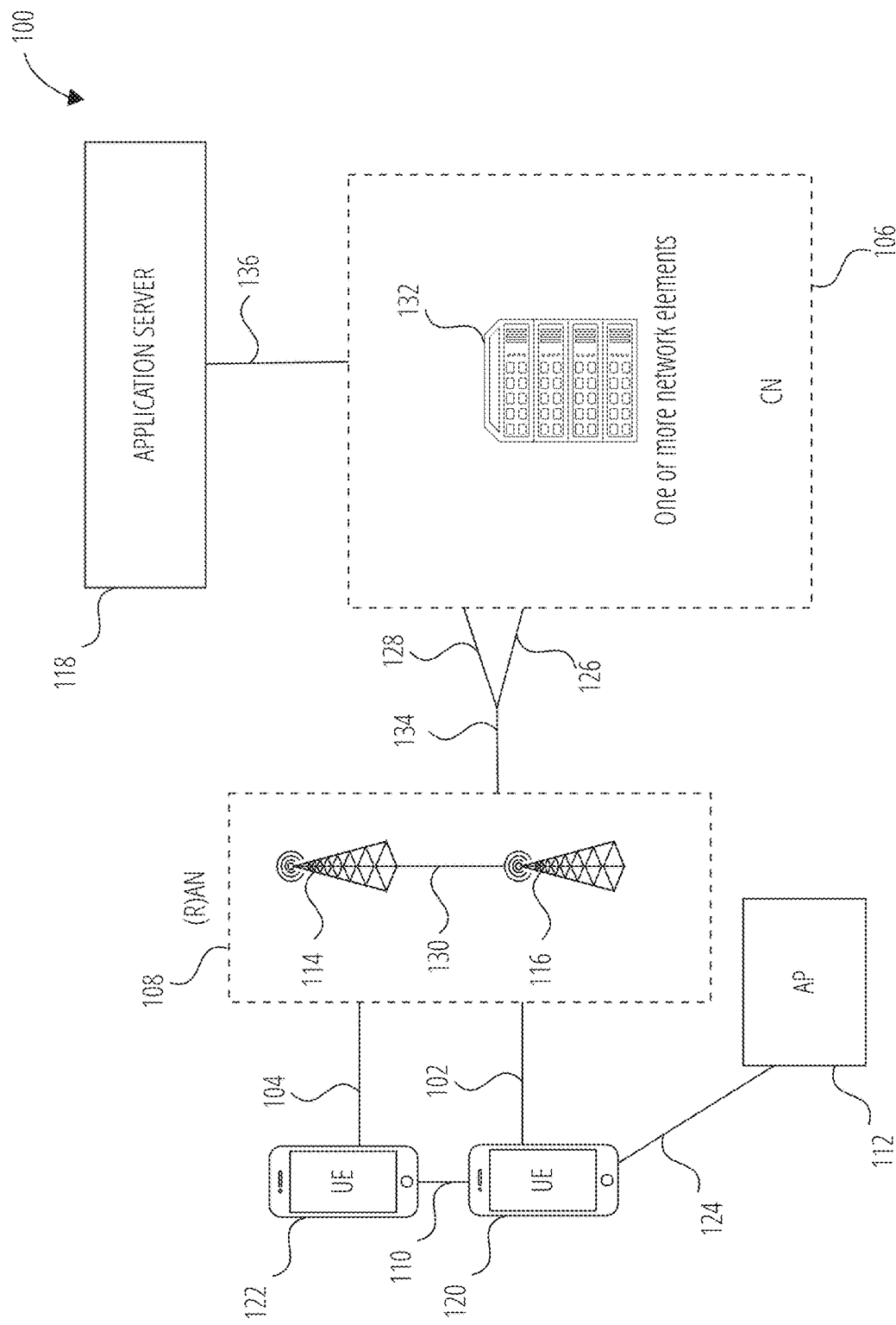
FIG. 1 illustrates a system in accordance with one embodiment.

A CORESET is a set of physical resources (i.e., a specific area on NR Downlink Resource Grid) and a set of parameters used to carry PDCCH/downlink control information (DCI). It is equivalent to LTE PDCCH area (the first 1, 2, 3, 4 OFDM symbols in a subframe). In an existing PDCCH design, a CORESET is configured by ControlResourceSet for the frequency domain resource allocation of the CORESET and the duration of the CORESET, i.e., 1/2/3 symbols.

Existing designs are summarized as follows. A maximum 5 CORESET can be configured per bandwidth part (BWP) for multi-downlink control information (DCI) multi-total radiated power (TRP) operation. A maximum 3 CORESET can be configured per BWP for all the other operations. A maximum 4 BWP can be configured per component carrier (CC). A maximum total 16 CORESETs can be configured per CC. SearchSpace is configured for the time domain pattern of the PDCCH monitoring. Each SearchSpace contains only one CORESET. A maximum 10 SearchSpace can be configured per BWP per CC.

In some previous attempts, the PDCCH beam can be updated. In Rel-15, for example, one MAC control element (CE) is able to update transmission configuration indicator (TCI) for CORESET (PDCCH) with the same ID. In Rel-16, the same MAC CE can update TCI for CORESET with indicated ID in a list of CCs.

The PDCCH reliability, however, is limited due to the following reason. The maximum duration of PDCCH is only 3 symbols. Each CORESET can be configured with only one beam, with no multi-beam diversity. PDCCH aggregation is also not supported. Accordingly, this disclosure describes the following enhancement to improve the PDCCH reliability: PDCCH aggregation and multi-beam PDCCH reception.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a SG RAN, an E-UTRAN, or a legacy RAN, such as a UTRAN or GERAN. As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node." "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs. and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116): a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an SGC via an NG interface (discussed infra).

In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, cLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 106 is an 5GC), the interface 130 may be an Xn interface. The Xn interface is defined between two or more RAN nodes (e.g., two or more gNBs and the like) that connect to 5GC, between a RAN node 114 (e.g., a gNB) connecting to 5GC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network—in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and AMFs.

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

PDCCH Aggregation

3GPP TS 38.331 defines PDCCH-Config, which is a configuration parameter for setting up PDCCH. The PDCCH-Config information element (IE) is used to configure UE-specific PDCCH parameters such as CORESETs, search spaces, and additional parameters for acquiring the PDCCH.

Figure 2:
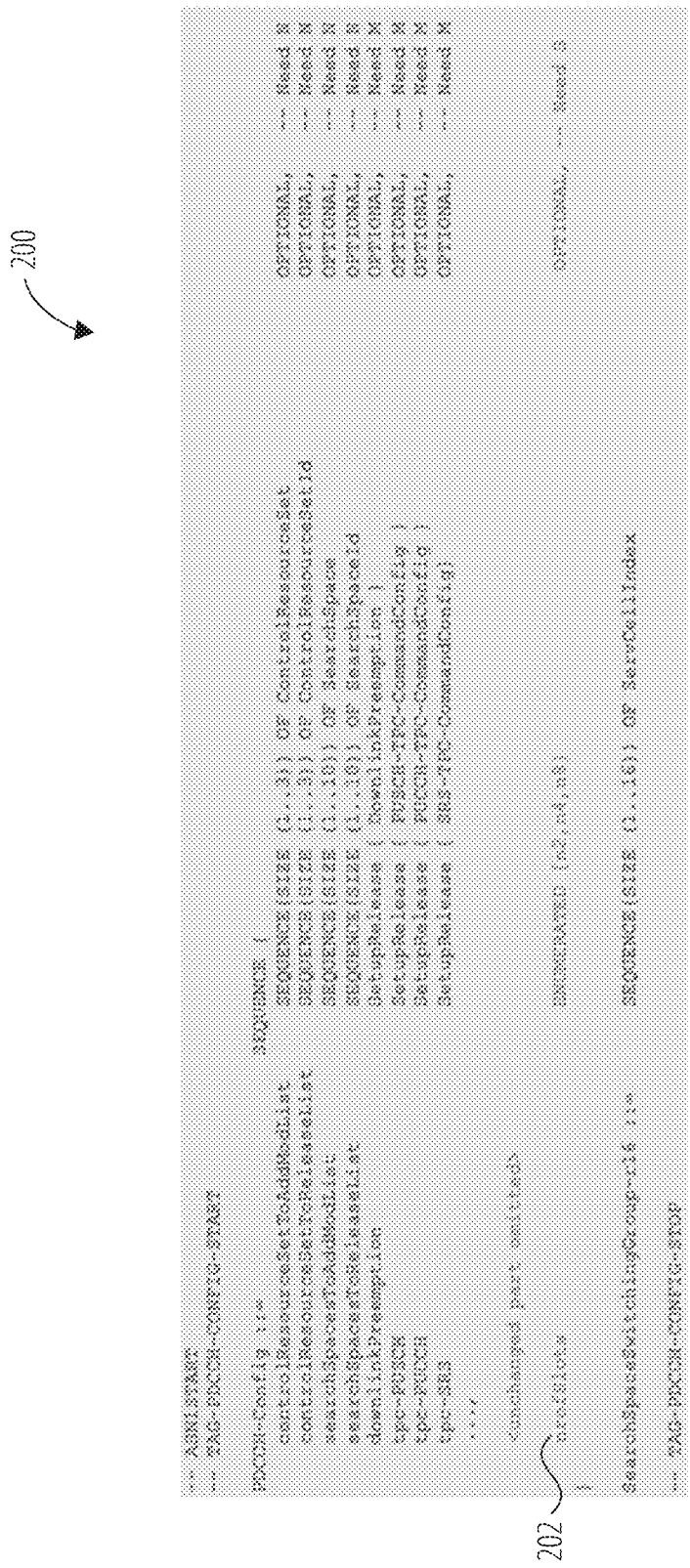
FIG. 2 illustrates an excerpt of a PDCCH-Config definition in accordance with one embodiment.

In addition to 1/2/3 symbol PDCCH, FIG. 2 shows how PDCCH repetition can also be configured for some embodiments. The PDCCH repetition can be configured as part of a PDCCH-Config 200, an example of which is shown in FIG. 2. A new IE, nrofSlots 202, is included in PDCCH-Config 200. The nrofSlots 202 can be configured as 2, 4, or 8 slots or even larger. Accordingly, PDCCH repetition will be transmitted in the configured number of consecutive slots indicated by the value of nrofSlots 202.

Figure 3:
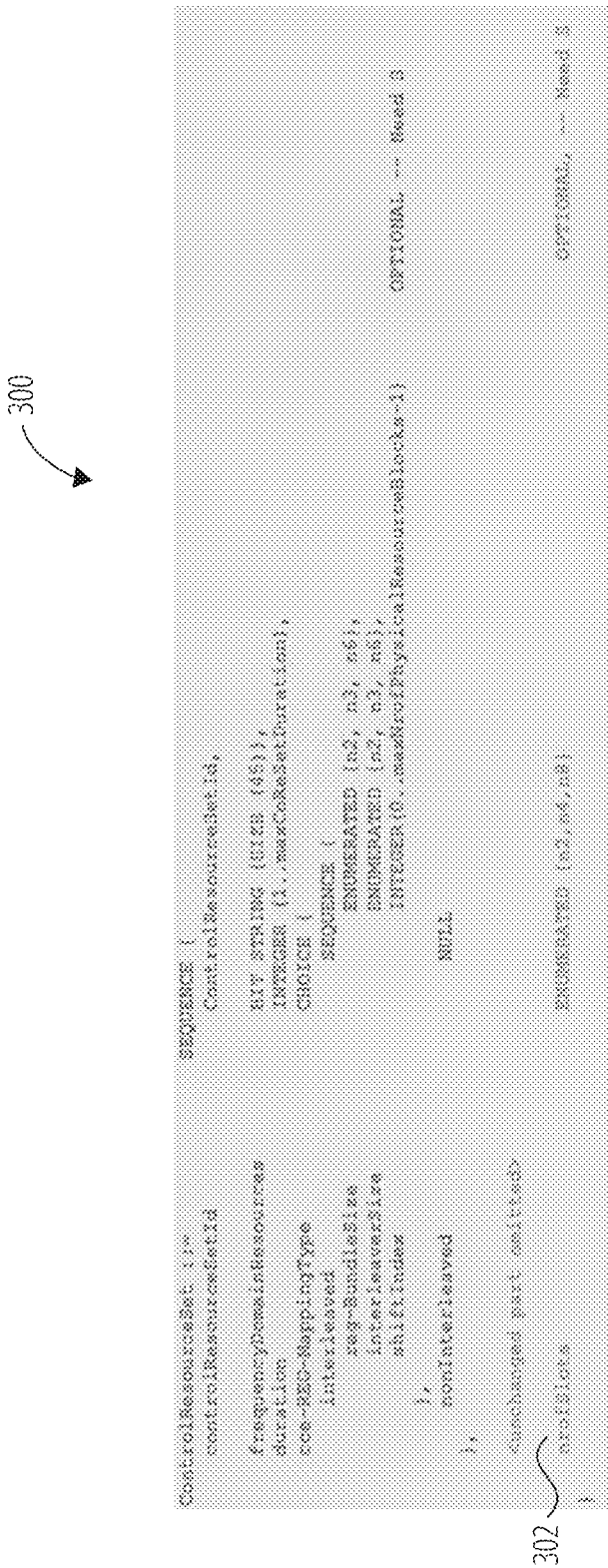
FIG. 3 illustrates an excerpt of a ControlResourceSet definition in accordance with one embodiment.

In addition to 1/2/3 symbol PDCCH, FIG. 3 shows how PDCCH repetition can also be configured for some embodiments. The PDCCH repetition can be configured as part of a ControlResourceSet 300, an example of which is shown in FIG. 3.

A new IE, nrofSlots 302, is included in ControlResourceSet 300. The nrofSlots 302 can be configured as 2, 4, or 8 slots or even larger. Accordingly, PDCCH repetition will be transmitted in the configured number of consecutive slots indicated by the value of nrofSlots 302.

CORESET duration can also be configured as more than three symbols, e.g., by setting maxCoReSetDuration to 4, 6, 9, etc.

Figure 4:
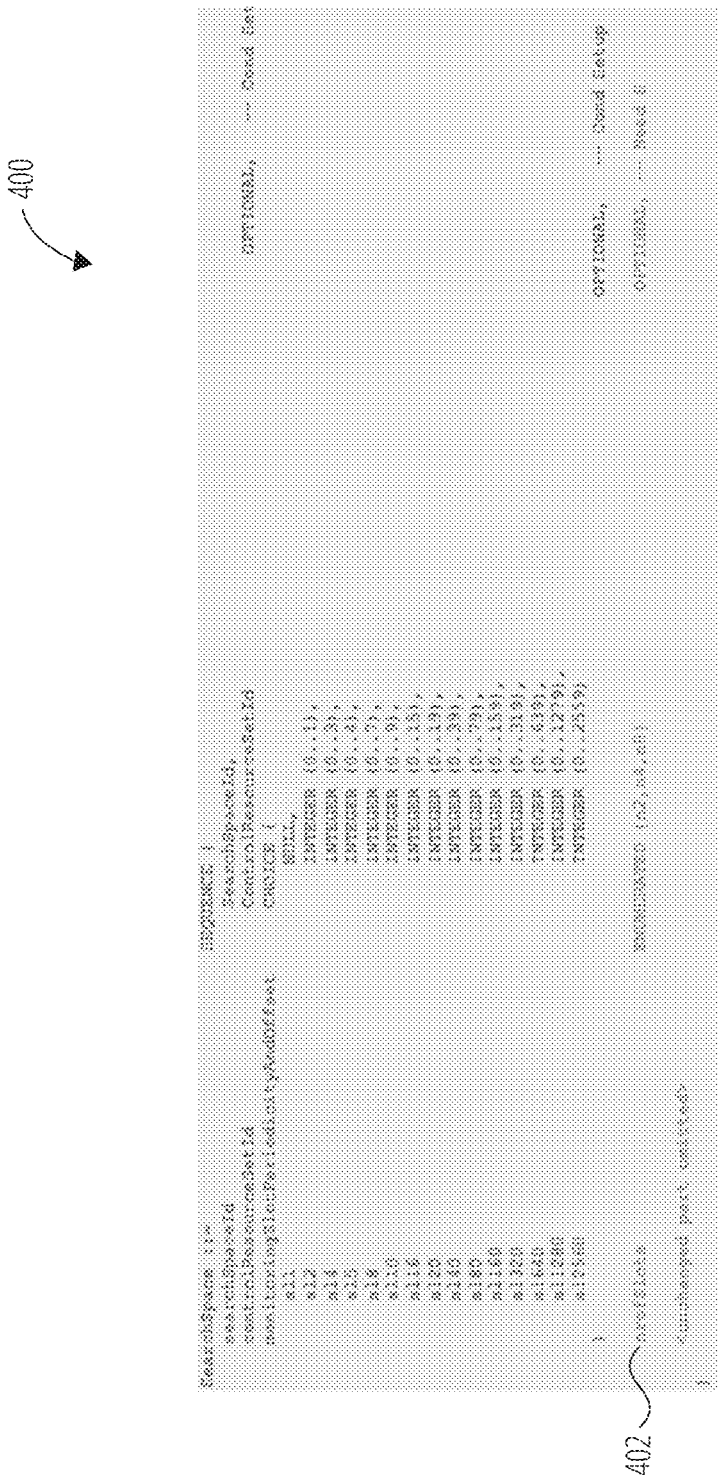
FIG. 4 illustrates an excerpt of a SearchSpace definition in accordance with one embodiment.

In addition to 1/2/3 symbol PDCCH, FIG. 4 shows how PDCCH repetition can also be configured for some embodiments. The PDCCH repetition can be configured as part of SearchSpace 400, an example of which is shown in FIG. 4.

A new IE, nrofSlots 402, is included in SearchSpace 400. The nrofSlots 402 can be configured as 2, 4, or 8 slots or even larger. Accordingly, PDCCH repetition will be transmitted in the configured number of consecutive slots indicated by the value of nrofSlots 402.

To simplify the UE decoding and hypothesis testing for each PDCCH repetition, each PDCCH repetition is independently encoded and self decodable in some embodiments. Relatedly, for some embodiments, the transmitted baseband signal is the same for different PDCCH repetition, although in other cases the signal is different due to different redundancy version or rate matching parameters. Furthermore, all the PDCCH repetition may be considered as one monitoring occasion. Within the monitoring occasion, repetition will not increase the number of blind detection (BD) and the number of non-overlapping Control Channel Elements (CCEs).

Figure 5:
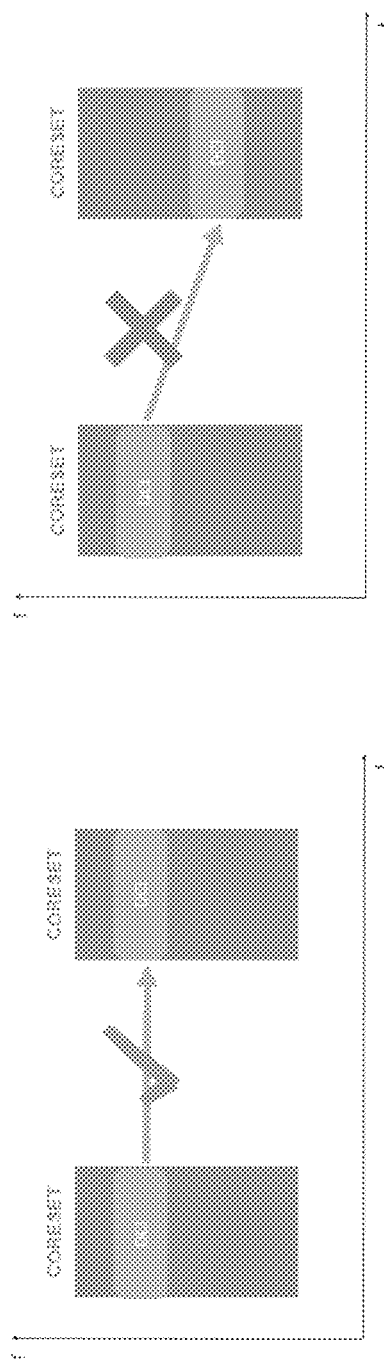
FIG. 5 illustrates a DCI transmission embodiment for PDCCH aggregation in accordance with one embodiment.

For PDCCH, for 15 kHz SCS for example, there are up to 44 BD. Each BD corresponds to one decoding candidate and corresponds to a certain resource allocation. FIG. 5 shows that, if DCI is transmitted in a particular candidate in one repetition, then it is also transmitted in the same candidate in the next repetition, as shown in the right side of FIG. 5. In contrast, the left side of FIG. 5 shows transmitting in a different candidates. In other words, FIG. 5 shows that a repetition of a PDCCH having DCI repeats that DCI in each repetition and in the same resource allocation.

In some embodiments, multiple repetition with a slot is allowed to be configured. In these embodiments, the network configures the number of repetitions and the offset between two repetitions. These configurations may be made (a) via RRC in either PDCCH-Config, ControlResourceSet, or SearchSpace, (b) via MAC-CE, or (c) via L1 DCI.

Figure 6:
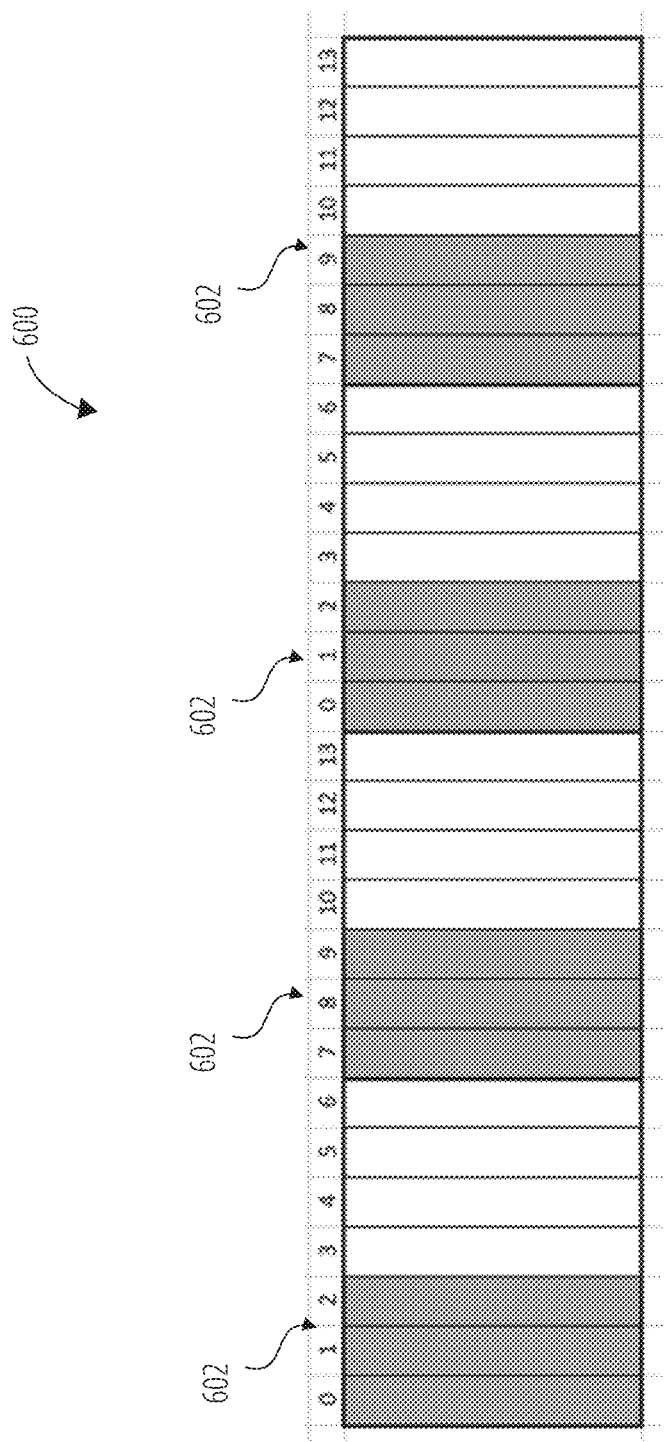
FIG. 6 illustrates an example PDCCH repetition in several slots in accordance with one embodiment.

For instance, FIG. 6 shows an example subframe 600, in which each repetition 602 contains three symbols, with a total of four repetitions, and a four-symbol offset between adjacent repetitions. As shown A single repetition is not allowed to across the slot boundary, in the embodiment shown in FIG. 6.

Figure 7:
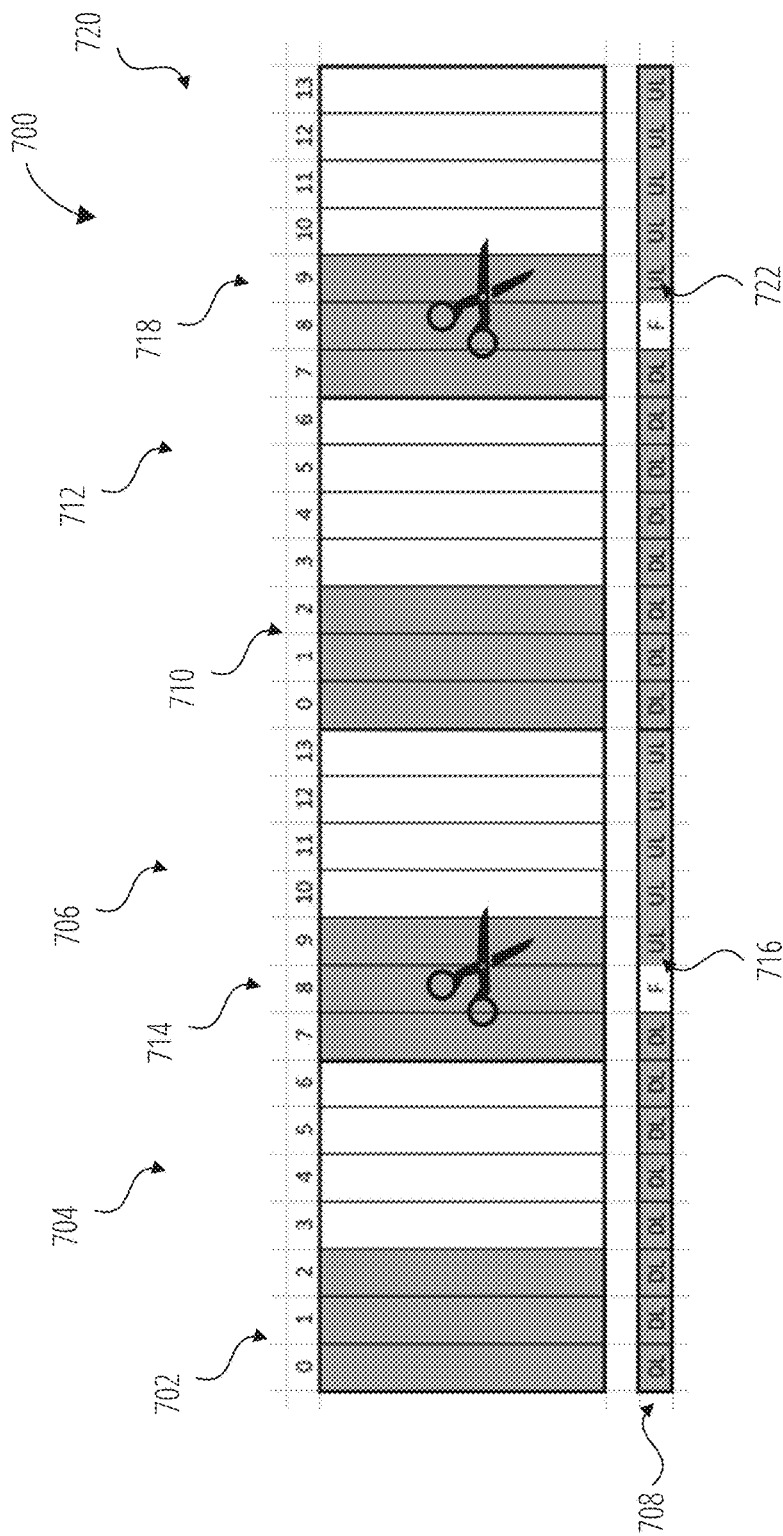
FIG. 7 illustrates an example of skipping repetitions in accordance with one embodiment.

FIG. 7 shows a subframe 700 for when a certain repetition becomes invalid. The repetition can be invalid if any symbol is configured as UL or it extends across a slot boundary. For example, a first repetition 702 in a first slot 704 is valid since it encompasses only DL symbols 708 and the three symbols of the first repetition 702 do not extend into a second slot 706. Similarly, a third repetition 710 in a third slot 712 is valid. In contrast, a second repetition 714 in second slot 706 is invalid because it encompasses an UL symbol 716. A fourth repetition 718 in a fourth slot 720 is also invalid because it includes an UL symbol 722. To address invalid repetitions, the following embodiments are possible.

In a first embodiment, the PDCCH repetition is skipped and the total number of repetition is reduced accordingly.

In a second embodiment, the PDCCH repetition is skipped and total number of repetition is not reduced but is extended. For example, if PDCCH repetition is configured in slot 0/1/2/3, and slot 1 becomes invalid, due to collision with UL symbol for example, then the actual PDCCH repetition is in slot 0/2/3/4, since slot 1 is skipped and replaced with slot 4.

In a third embodiment, a shift is performed in which the shift is a minimum of number of symbols to find the next valid repetition location.

Multi-Beam PDCCH Reception

Figure 8:
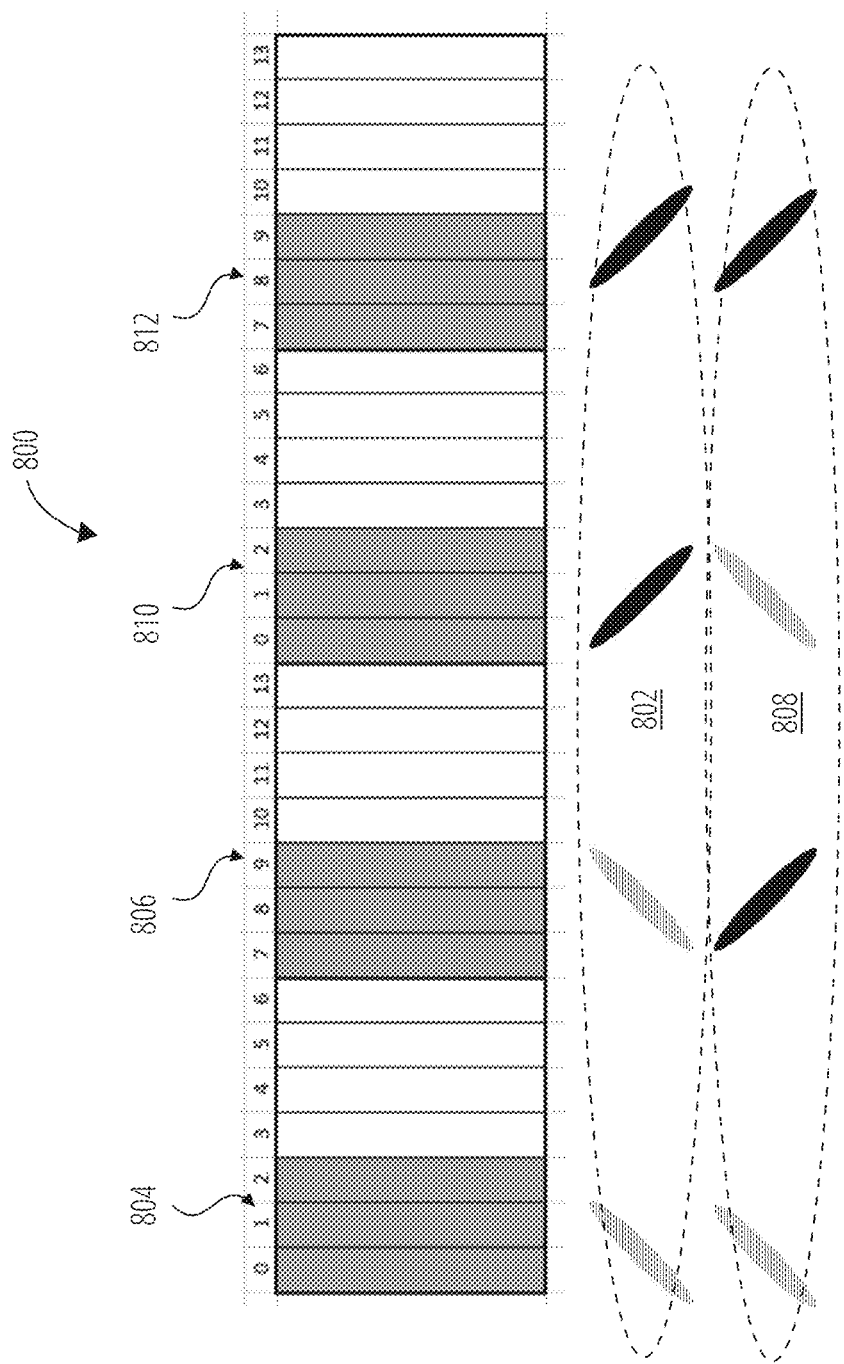
FIG. 8 illustrates an example of different repetitions to be received with different beams in accordance with one embodiment.

As shown in FIG. 8, when PDCCH repetition is configured, different repetition can be configured to be received with different beams. Different patterns can be configured for the beams to be used during different repetitions. For example, FIG. 8 shows two examples for two beams.

A first example shows the two beams following a cyclic pattern 802 in which a first beam is used for a first repetition 804 and a second repetition 806 whereas a second beam is used for a third repetition 810 and a fourth repetition 812. Thus, a first set of the repeated PDCCH (the first repetition 804 and the second repetition 806) is received using the first beam, and a second set of the repeated PDCCH (the third repetition 810 and the fourth repetition 812) is received using the second beam that is different from the first beam.

A second example shows the two beams following a sequential pattern 808 in which a first beam is used for the first repetition 804 and the third repetition 810 whereas the second beam is used for the second repetition 806 and the fourth repetition 812.

Figure 9:
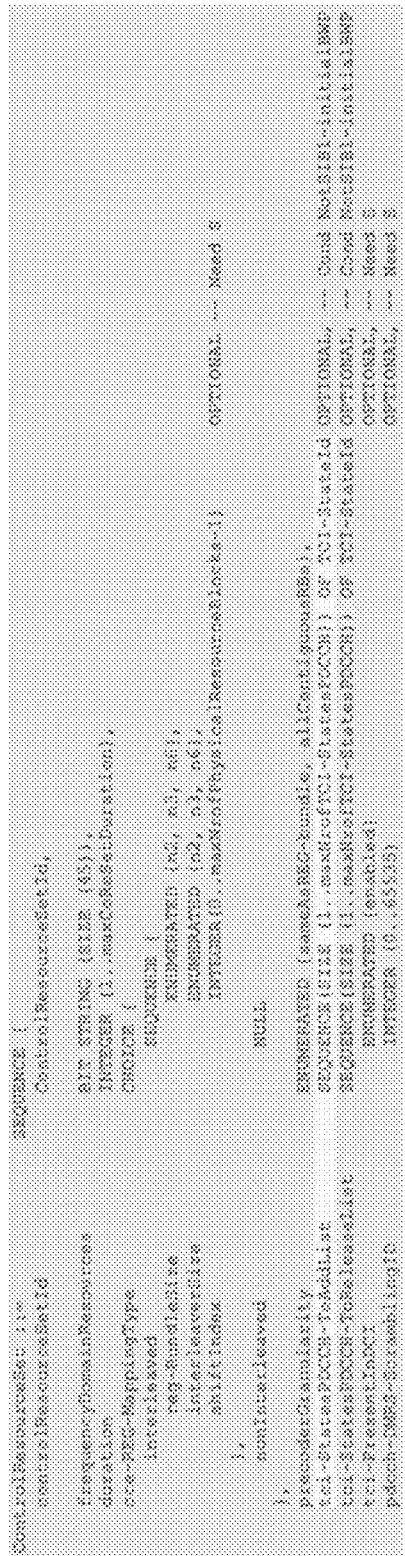
FIG. 9 illustrates an excerpt of a ControlResourceSet definition in accordance with one embodiment.

The multi-beam PDCCH reception can be configured as part of a ControlResourceSet 900, an example of which is shown in FIG. 9. The IE tci-StatesPDCCH-ToAddList provides one or more TC states. It provides Quasi-Colocation information for successful reception of PDCCH If multiple TCI state are listed in ControlResourceSet IE, then UE receives an activation command to identify which TCI state to apply. Activation command is provided using MAC CE.

Accordingly, TCI codepoint can be configured in the ControlResourceSet 900. Each TCI codepoint can contain more than one TCI State. A MAC-CE can be used to configure the multiple beam PDCCH reception to configure CORESET with a certain TCI codepoint. In other words, a MAC-CE is used to configure the TCI, i.e., beam, for CORESET in the current specification. But it is allowed to configure a single beam. Thus, MAC-CE is enhanced to configure two beams, using either of the following two approaches (a) MAC-CE directly configure two beams, or (b) RRC configures TC codepoint, and some codepoint can contain two beams. MAC-CE configure a particular TCI codepoint to a particular CORESET The multi-beam PDCCH reception can also be configured using TC codepoint configured in the SearchSpace. In one example, more than one ControlResourceSetId can be configured in SearchSpace. Multiple ControlResourceSetId can be mapped to different PDCCH repetition, in sequential or cyclic order. For ControlResourceSet need to have the same duration and/or frequency domain allocation.

In another example, TCI state or TCI codepoint can be configured in SearchSpace. In the SearchSpace RRC configuration, a list of multiple TCI states can be configured, or a TCI codepoint can be configured in which TC codepoint can contain more than one TC states. TCI codepoint may also be configured by other RRC messages.

Figure 10:
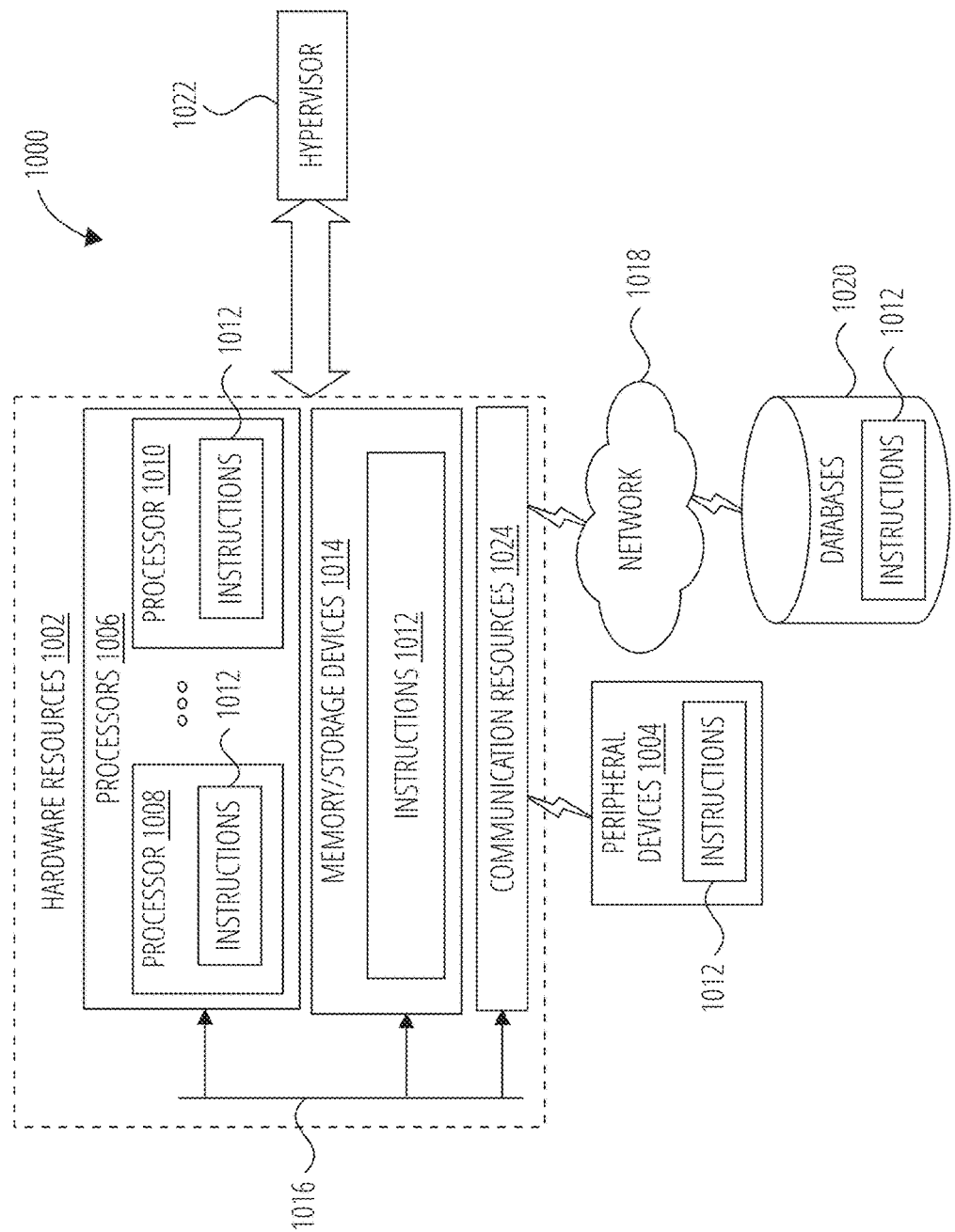
FIG. 10 illustrates components 1000 in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method, performed by a user equipment (UE), for obtaining a repeated physical downlink control channel (PDCCH), the method comprising: processing a PDCCH-Config, ControlResourceSet, or SearchSpace configuration parameter including an information element (IE) indicating a number of consecutive slots in which the PDCCH is repeated; and receiving the repeated PDCCH in the number of consecutive slots.

Example 2 is the method of Example 1 in which the PDCCH-Config configuration parameter includes the IE.

Example 3 is the method of Example 1 in which the ControlResourceSet configuration parameter includes the IE.

Example 4 is the method of Example 1 in which the SearchSpace configuration parameter includes the IE.

Example 5 is the method of Example 1 in which the IE is a nrofSlots parameter.

Example 6 is the method of Example 1 in which each PDCCH repetition in the number of consecutive slots is independently encoded and self decodable.

Example 7 is the method of Example 1 in which each PDCCH repetition carries a transmitted baseband signal that is common to all the repeated PDCCH in the number of consecutive slots.

Example 8 is the method of Example 1, further comprising receiving downlink control information (DCI) at a same resource allocation for each PDCCH repetition in the number of consecutive slots collectively corresponding to one monitoring occasion.

Example 9 is the method of Example 1 in which each PDCCH repetition in the number of consecutive slots has a same number of PDCCH symbols and a same number of non-PDCCH symbols in each slot.

Example 10 is the method of Example 1, further comprising skipping a PDCCH repetition that would not be located in a valid repetition location including a PDCCH that would cross a slot boundary or include an uplink symbol.

Example 11 is the method of Example 10, further comprising obtaining the skipped PDCCH in a next valid repetition location.

Example 12 is the method of Example 1, further comprising multiple beam PDCCH reception by receiving a first set of the repeated PDCCH from a first beam and receiving a second set, different from the first set, of the repeated PDCCH from a second beam that is different from the first beam.

Example 13 is the method of Example 12 in which the first and second beams employed according to a cyclic pattern or a sequential pattern.

Example 14 is the method of Example 12 in which the first and second beams are configured in the ControlResourceSet configuration parameter and a MAC-CE to configure a CORESET with a transmission configuration indicator (TCI) codepoint.

Example 15 is the method of Example 12 in which the first and second beams are configured in the SearchSpace configuration parameter.

Example 16 is the method of Example 15 in which the SearchSpace configuration parameter includes first and second ControlResourceSetIds mapped to, respectively, the first and second sets of the repeated PDCCH.

Example 17 is the method of Example 15 in which the SearchSpace configuration parameter includes a transmission configuration indicator (TCI) state or codepoint configuration parameter to configure the multiple beam PDCCH reception.

Example 18 is a non-transitory computer-readable storage medium for a computer of user equipment (UE), the computer-readable storage medium including instructions for obtaining a repeated physical downlink control channel (PDCCH), the instructions, when executed by the computer, cause the computer to: process a PDCCH-Config, ControlResourceSet, or SearchSpace configuration parameter including an information element (IE) indicating a number of consecutive slots in which the PDCCH is repeated; and receive the repeated PDCCH in the number of consecutive slots.

Example 19 is the computer-readable storage medium of Example 18 in which the PDCCH-Config configuration parameter includes the IE.

Example 20 is the computer-readable storage medium of Example 18 in which the ControlResourceSet configuration parameter includes the IE.

Example 21 is the computer-readable storage medium of Example 18 in which the SearchSpace configuration parameter includes the IE.

Example 22 is the computer-readable storage medium of Example 18 in which the IE is a nrofSlots parameter.

Example 23 is the computer-readable storage medium of Example 18 in which each PDCCH repetition in the number of consecutive slots is independently encoded and self decodable.

Example 24 is the computer-readable storage medium of Example 18 in which each PDCCH repetition carries a transmitted baseband signal that is common to all the repeated PDCCH in the number of consecutive slots.

Example 25 is the computer-readable storage medium of Example 18, wherein the instructions further configure the computer to receive downlink control information (DCI) at a same resource allocation in each PDCCH repetition in the number of consecutive slots so as to collectively correspond to one monitoring occasion.

Example 26 is the computer-readable storage medium of Example 18 in which each PDCCH repetition in the number of consecutive slots has a same number of PDCCH symbols and a same number of non-PDCCH symbols in each slot.

Example 27 is the computer-readable storage medium of Example 18, wherein the instructions further configure the computer to skip a PDCCH repetition that would not be located in a valid repetition location including a PDCCH that would cross a slot boundary or include an uplink symbol.

Example 28 is the computer-readable storage medium of Example 27, wherein the instructions further configure the computer to obtain the skipped PDCCH in a next valid repetition location.

Example 29 is the computer-readable storage medium of Example 18, wherein the instructions further configure the computer to multiple beam PDCCH reception by receive a first set of the repeated PDCCH from a first beam and receiving a second set, different from the first set, of the repeated PDCCH from a second beam that is different from the first beam.

Example 30 is the computer-readable storage medium of Example 29 in which the first and second beams employed according to a cyclic pattern or a sequential pattern.

Example 31 is the computer-readable storage medium of Example 29 in which the first and second beams are configured in the ControlResourceSet configuration parameter and a MAC-CE to configure a CORESET with a transmission configuration indicator (TCI) codepoint.

Example 32 is the computer-readable storage medium of Example 29 in which the first and second beams are configured in the SearchSpace configuration parameter.

Example 33 is the computer-readable storage medium of Example 32 in which the SearchSpace configuration parameter includes first and second ControlResourceSetIds mapped to, respectively, the first and second sets of the repeated PDCCH.

Example 34 is the computer-readable storage medium of Example 32 in which the SearchSpace configuration parameter includes a transmission configuration indicator (TCI) state or codepoint configuration parameter to configure the multiple beam PDCCH reception.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE), for obtaining a repeated physical downlink control channel (PDCCH), the method comprising:

processing a PDCCH-Config, ControlResourceSet, or SearchSpace configuration parameter including an information element (IE) indicating a number of consecutive slots in which the PDCCH is repeated;

receiving the repeated PDCCH in the number of consecutive slots, wherein receiving the repeated PDCCH comprises performing multiple beam PDCCH reception by receiving a first set of the repeated PDCCH from a first beam and receiving a second set, different from the first set, of the repeated PDCCH from a second beam that is different from the first beam, and wherein a MAC-CE is used to configure the multiple beam PDCCH reception, in which the first beam used to receive the first set of the repeated PDCCH and second beam used to receive the second set of the repeated PDCCH are configured in the ControlResourceSet configuration parameter and the MAC-CE to configure a CORESET with a transmission configuration indicator (TCI) codepoint; and skipping a PDCCH repetition that is not located in a valid repetition location including a PDCCH that crosses a slot boundary or include an uplink symbol.

2. The method of claim 1 in which the PDCCH-Config configuration parameter includes the IE.

3. The method of claim 1 in which the ControlResourceSet configuration parameter includes the IE.

4. The method of claim 1 in which the SearchSpace configuration parameter includes the IE.

5. The method of claim 1 in which the IE is a nrofSlots parameter.

6. The method of claim 1 in which each PDCCH repetition in the number of consecutive slots is independently encoded and self decodable.

7. The method of claim 1 in which each PDCCH repetition carries a transmitted baseband signal that is common to all the repeated PDCCH in the number of consecutive slots.

8. The method of claim 1, further comprising receiving downlink control information (DCI) at a same resource allocation for each PDCCH repetition in the number of consecutive slots collectively corresponding to one monitoring occasion.

9. The method of claim 1 in which each PDCCH repetition in the number of consecutive slots has a same number of PDCCH symbols and a same number of non-PDCCH symbols in each slot.

10. The method of claim 1, further comprising obtaining the skipped PDCCH in a next valid repetition location.

11. The method of claim 1 in which the first and second beams employed according to a cyclic pattern or a sequential pattern.

12. The method of claim 1 in which the first and second beams are configured in the SearchSpace configuration parameter.

13. The method of claim 12 in which the SearchSpace configuration parameter includes first and second ControlResourceSetIds mapped to, respectively, the first and second sets of the repeated PDCCH.

14. The method of claim 12 in which the SearchSpace configuration parameter includes a TCI state or codepoint configuration parameter to configure the multiple beam PDCCH reception.

15. A non-transitory computer-readable storage medium for a computer of user equipment (UE), the computer-readable storage medium including instructions for obtaining a repeated physical downlink control channel (PDCCH), the instructions, when executed by the computer, cause the computer to:

process a PDCCH-Config, ControlResourceSet, or SearchSpace configuration parameter including an information element (IE) indicating a number of consecutive slots in which the PDCCH is repeated; and receive the repeated PDCCH in the number of consecutive slots, wherein receiving the repeated PDCCH comprises performing multiple beam PDCCH reception by receiving a first set of the repeated PDCCH from a first beam and receiving a second set, different from the first set, of the repeated PDCCH from a second beam that is different from the first beam, and wherein a MAC-CE is used to configure the multiple beam PDCCH reception, in which the first beam used to receive the first set of the repeated PDCCH and second beam used to receive the second set of the repeated PDCCH are configured in the ControlResourceSet configuration parameter and the MAC-CE to configure a CORESET with a transmission configuration indicator (TCI) codepoint; and skip a PDCCH repetition that is not located in a valid repetition location including a PDCCH that crosses a slot boundary or include an uplink symbol.

16. The computer-readable storage medium of claim 15 in which the PDCCH-Config configuration parameter includes the IE.

17. The computer-readable storage medium of claim 15 in which the ControlResourceSet configuration parameter includes the IE.

* * * * *